United States Patent Office 3,417,152
Patented Dec. 17, 1968

3,417,152
METHOD OF STABILIZING
TRICHLOROETHYLENE
Germano Patron, Milan, Italy, Ottavio Merluzzi, Toronto, Ontario, Canada, and Antonio Ferri, Milan, Italy, assignors to Montecatini Edison S.p.A., Milan, Italy
No Drawing. Continuation of application Ser. No. 420,852, Dec. 4, 1964. This application May 31, 1966, Ser. No. 554,220
Claims priority, application Italy, Mar. 11, 1960 1,675/60
1 Claim. (Cl. 260—652.5)

This application is a continuation of S.N. 420,852, now abandoned, which in turn is a continuation-in-part of application Ser. No. 76,466, filed October 19, 1960 (now abandoned).

The present invention relates to the stabilization of chlorinated hydrocarbons and, more particularly, to a method of stabilizing trichloroethylene, as well as the composition produced by this method.

As pointed out in our above-identified copending application and as will be apparent from the commonly assigned U.S. Patent No. 3,000,977, issued Sept. 19, 1961, to two of the present joint inventors, trichloroethylene can be stabilized by the admixture therewith of nitrogen-containing adjuvants of a weakly basic character. This stabilization of chlorinated hydrocarbons and especially trichloroethylene is essential in practice, since the latter compound is a solvent widely used for the decreasing of metals, the drycleaning of fabrics, and solvent extractions. In addition to being highly volatile and thus able to be recirculated after use and distillation, it is liquid at ambient temperature and has excellent solvent capabilities. It has, however, one significant disadvantage, namely its propensity toward self-catalyzed decomposition to produce acids upon oxidation of the chlorinated hydrocarbons. Thus, trichloroethylene, in the absence of any stabilizers or the like, will, upon exposure to air, produce hydrochloric acid whose presence catalyzes further decomposition of the solvent. it has been proposed heretofore to stabilize the solvent against such decomposition by adding thereto compounds having a weakly basic character and thus being adapted to neutralize the acidity which otherwise would tend to catalyze the decomposition, or preferentially oxidizable materials which, as a consequence of their selective oxidation by atmospheric oxygen, prevent an equivalent degree of decomposition of the trichloroethylene. Thus, it has been proposed to form compositions of the chlorinated hydrocarbons with amines and epoxides which neutralize acid as formed and phenols which are preferentially oxidized to quinonic forms. The decomposition of trichloroethylene yields not only hydrogen chloride but also phosgene, a highly toxic and nausea-inducing compound.

It is the principal object of the present invention to provide an improved method of stabilizing chlorinated hydrocarbons and, especially, trichloroethylene.

It is a further object of this invention to provide a stabilized trichloroethylene composition in extension of some of the principles set forth in our above-mentioned copending application and free from disadvantageous results characterizing earlier stabilization systems, as noted hereinafter.

In any system for the stabilization of chlorinated hydrocarbons, and especially trichloroethylene, it is important that the following criteria must be observed:

(a) The stabilizing agent or agents must be at most only weakly basic to preclude attack upon amphoteric metals (e.g., aluminum, zinc and alloys thereof) with which the trichloroethylene is commonly used for the removal of greases. In the case of these metals, both the acidity resulting from decomposition and the basicity resulting from any use of highly basic stabilizers, are equally disadvantageous.

(b) The degreasing of metal is carried out generally in the vapor phase and the stabilizers and decomposition inhibitors must be present in the vapor phase as well as in the liquid phase. This is all the more important when it is realized that vaporization of trichloroethylene renders it highly susceptible to decomposition by atmospheric oxygen.

(c) The stabilization compounds must be such as not to impede materially the operation of the solvent, either by virtue of the quantity of the decomposition inhibitor present or by the nature of its structure.

Thus, the present invention is directed to the stabilization of chlorinated hydrocarbons, especially trichloroethylene, in a manner which will inhibit the formation of phosgene and thereby obviate any difficulties arising from the presence of this noxious substance in degreasing plants and the like, while precluding the formation of hydrogen chloride by hydrolysis of the phosgene; the hydrochloric acid is, as is well known, extremely corrosive to the equipment and degreased metallic parts. The stabilizing compositions should, according to the present invention, include a reliable anti-oxidant, should be free from substances of highly basic character, and should have a boiling point close to that of trichloroethylene. The basicity of the antidecomposition substances are, for the present purposes, evaluated from the pH of the water extract of the solvent composition. Thus, this pH should be about 7.

We have now found that all of these characteristics are fulfilled by decomposition-inhibiting agents including formaldehyde dialkylhydrozones of the general formula:

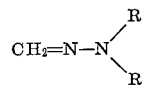

wherein R is an alkyl group, preferably methyl. Thus, stabilized compositions of the present invention should include dimethyl hydrazones which is variously known also as methylene dimethylhydrazone and methanal dimethyl hydrazone. In our copending application Ser. No. 76,466, filed Dec. 19, 1960, now abandoned, we have disclosed that aldehyde dialkylhydrazones constitute a marked improvement over hydrazine derivatives of the general formula:

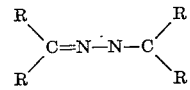

when employed for the stabilization of trichloroethylene. It was also noted in this application that, in general, equivalent quantities by weight of the methylene (formaldehyde) dialkylhydrazone and the corresponding ethylidene (acetaldehyde) dialkylhydrazone gave poorer results with the latter compound than with the former. It has now been found that the superior character of the formaldehyde dialkylhydrazone permits considerably less of it to be employed for the stabilization of trichloroethylene with consequent advantages. Thus, it has been noted that acetaldehyde dialkylhydrazone, for example, is less significant in the vapor phase for the most part and, in any event, is certainly less available than is formaldehyde dimethylhydrazone. Moreover, surprisingly less of the formaldehyde dimethylhydrazone is required than the acetaldehyde dimethylhydrazone. Discoloration of the liquid and vapor phases is reduced while difficulties encountered in the use of the higher-molecular-weight compound (i.e., acetaldehyde dialkylhydrazone) with respect to loss, decomposition and discoloration upon repurification of the solvent are avoided.

More specifically, it has been found that, broad disclosures in the art notwithstanding, a reduction in the proportion of acetaldehyde dimethylhydrazone in the trichloroethylene composition of 0.01% by weight, i.e., 100 parts per million (p.p.m.), results in a sharp drop in the stabilizing capacity of the acetaldehyde dimethylhydrazone. In contradistinction, the formaldehyde-dimethylhydrazone system of the present invention can have as low as 0.001% of the hydrazone (by weight) and preferably contains between 0.001% (10 p.p.m.) and 0.008% (80 p.p.m.) of formaldehyde dimethylhydrazone although amounts up to 0.01% are effective and 0.02% (200 p.p.m.) does not involve a significant reduction in effectiveness but other disadvantages begin to arise. Thus, it is an essential feature of the present invention that the improved stabilizing composition contains less than 0.01% by weight (100 p.p.m.) of formaldehyde dimethylhydrazone but an excess of about 0.001% (10 p.p.m.), based upon the weight of trichloroethylene.

As described in our copending application referred to above, the formaldehyde dimethylhydrazone should be incorporated in the solvent together with at least one epoxide component, in an amount ranging between 0.01% (100 p.p.m.) and 1% (10,000 p.p.m.) by weight of the solvent, and preferably from 0.05% (500 p.p.m.) to 0.3% (3,000 p.p.m.) by weight; the other constituent of the mixture can be a phenol present in an amount between 0.001% (10 p.p.m.) and 0.05% (500 p.p.m.) by weight, preferably from 0.001% (10 p.p.m.) to 0.01% (100 p.p.m.). Diisobutylene can be substituted for phenol. Suitable phenols include thymol, p-tertiaryamyl phenol which may be present in amounts between 0.001 to 0.01% and hydroquinone monomethyl ether which may be present in amounts 0.001 and 0.1% by weight trichloroethylene.

The following specific examples illustrate the principles of the present invention.

Example I

Substituted hydrazines such as the dialkylidene-N,N'-hydrazones are compared with alkylidene dialkylhydrazones and the latter compounds are compared among themselves as follows:

In accordance with the procedures set forth in Army-Navy Aeronautical Specification U.S. MIL-T 7003 of Sept. 5, 1950, trichloroethylene was stabilized by the addition of the various compounds and subjected to the accelerated oxidation test of this standard. In accordance with this standard, 200 ml. of the stabilized composition are subjected to 48 hours of reflux boiling into a stream of water-saturated oxygen using a 150-watt sandblasted lamp as the heat source. Steel plates are disposed in the liquid and vapor phases to determine the corrosivity and the composition is extracted with water to test the pH. The phosgene content is determined from the composition by conventional means. The results are as follows:

(A) When compositions of trichloroethylene are stabilized with 0.02% of diethylidene-N,N' hydrazone (CH₃CH=N—N=CHCH₃) and diisopropylidene-N,N' hydrazone [(CH₃)₂C=N—N=C(CH₃)₂], the water extract had a pH of 2 and the composition was found to be saturated with phosgene. 0.04% by weight of each of these compounds yielded identical results.

(B) Ethylidene dimethylhydrazone or acetaldehyde dimethylhydrazone

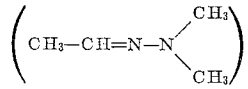

in an amount of 0.02% by weight yielded a water extract whose pH was between 4 and 5 and produced a composition showing traces of phosgene. 0.04% of the amount of this latter compound in the composition raised the pH to between 5 and 6. When the proportion was 0.025% by weight, the composition yielded a pH of about 6 for the water extract, while a reduction in the proportion to 0.01% results in a pH of 3 to 4. In the latter case the vapor phase was found to be corrosive and the composition had a brown coloration. Any attempt to further lower the proportion of the acetaldehyde dimethylhydrazone resulted in a sharp increase in the production of acid as observed from the water extract. Tests made with the acetaldehyde diethylhydrazone gave similar results. Traces of phosgene were, however, found in the case of the acetaldehyde dimethylhydrazone.

(C) The test was carried out with 0.25% by weight methylene dimethylhydrazone, i.e., formaldehyde dimethylhydrazone

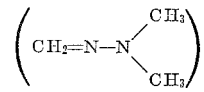

and the pH of the water extract (the solvent composition being always extracted with an equal volume of water) was found to be 7.00 after the accelerated oxidation test. When 0.02% by weight of this hydrazone was employed, the pH was again found to be about 7 for the water extract and no phosgene whatsoever was observed. Reduction of the proportion of the formaldehyde dimethylhydrazone to 0.01% reduced to a slight extent the pH of the water extract upon accelerated oxidation, although stabilization was still effected and the vapor phase found to be noncorrosive even when the proportion was reduced to 0.005% (5 p.p.m.) When this proportion of acetaldehyde dimethyl hydrazone was employed, no stabilization was observed.

Example II.—Composition including an epoxide (A) The accelerated oxidation tests described above were carried out with 0.25% by weight of acetaldehyde dimethylhydrazone and 0.20% butylene oxide. The relatively clear composition was found to have a pH slightly less than 6.9 and the vapor phase was found to be noncorrosive and clear. When, however, the proportion of acetaldehyde was reduced to 0.01 weight percent, the pH dropped to between 5 and 6 for the water extract and poor stabilization resulted. At a proportion of formaldehyde dimethylhydrazone of 0.01%, the pH was found to be just below 7 with the same proportion of the epoxide component. When the formaldehyde-dimethylhydrazone proportion was further reduced to 0.005% by weight, effective stabilization was still obtained, whereas the composition containing acetaldehyde dimethylhydrazone at this proportion was totally unsuitable.

(B) When 0.20% by weight of propylene oxide was substituted for the butylene oxide of Example II(A) above, 0.01% acetaldehyde dimethylhydrazone gave a pH between 4 and 5 for the water extract, a brown coloration, accelerated oxidation and a discolored vapor phase. By contrast, the formaldehyde dimethylhydrazone of the present invention had a pH not less than 6 and a noncorrosive vapor phase. Reduction of the proportion of the latter compound in the composition to 0.005% by weight still yielded satisfactory stabilization.

(C) When equal parts by weight of propylene oxide and butylene oxide were used in these compositions, results generally similar to those obtained with only butylene oxide as the epoxide were discerned.

Example III.—Hydrazone, epoxide and phenol composition (A) A trichloroethylene composition containing 0.025% by weight of acetaldehyde dimethylhydrazone, 0.1% butylene oxide, 0.1% propylene oxide and 0.005% thymol was subjected to the accelerated-oxidation test previously described. The liquid phase was found to be slightly discolored while the aqueous extract gave a pH of 7.20, i.e., an alkaline value of sufficient basicity to attack amphoteric metals. When the proportion of the acetaldehyde dimethylhydrazone was reduced to 0.01%, the pH of the water extract fell to 6 and acid corrosion was ascribable to the liquid phase.

By contrast, an identical composition substituting 0.01% by weight of formaldehyde dimethylhydrazone for the hydrazone of part A above gave a pH of 7 and was characterized by a clear (undiscolored) liquid phase and a similar translucent vapor phase. Reduction of the formaldehyde dimethylhydrazone concentration to 0.005% by weight of the trichloroethylene gave effective stabilization whereas a similar reduction in the concentration of acetaldehyde dimethylhydrazone rendered the composition unsuitable because of its high acidity and tendency to decompose.

(B) The proportions of Example III(A) were employed except that the phenol was p-tertiaryamyl phenol with a concentration of acetaldehyde dimethylhydrazone of 0.01% by weight; a pH of less than 7 was observed by contrast to the pH of 7 obtained with an identical quantity of formaldehyde dimethylhydrazone. Again, further reduction in the concentration of the hydrazone resulted in complete loss of stabilization qualities for the acetaldehyde dimethylhydrazone composition, while stabilization was maintained to a concentration of about 0.001% by weight with the formaldehyde dimethylhydrazone.

Example IV.—Hydrazone, epoxide and quinone composition (A) Trichlorethylene was stabilized with a system consisting of 0.01% by weight of acetaldehyde dimethylhydrazone, 0.1% butylene oxide, 0.1% propylene oxide and 0.005% hydroquinone monomethyl ether. The pH of the composition was found to be about 6 and further lowering of the hydrazone concentration reduced the pH further and eliminated any stabilization qualities of the composition. When a similar composition was prepared with 0.01% by weight of formaldehyde dimethylhydrazone, the pH of the aqueous extract was found to be 7 and reduction of the hydrazone concentration to 0.005% and therebelow still gave stabilization qualities.

(B) The composition of Example IV(A) was employed except that 0.02% by weight of diisobutylene (based upon the quantity of trichloroethylene) was admixed therewith. The pH was found to be 6. When an equivalent quantity of the formaldehyde dimethylhydrazone was employed, however, a pH of 7 was obtained.

Example V

The stabilization system of Example IV(B) was used except for the omission of the hydroquinone monomethyl ether. The composition containing 0.01% by weight of the acetaldehyde dimethylhydrazone had a pH of only 6 whereas that containing an equivalent quantity (by weight) of formaldehyde dimethylhydrazone gave a pH of 7. Reduction of the concentration of the hydrazone in each case to 0.005% by weight led to complete loss of stabilization qualities for the acetaldehyde-dimethylhydrazone composition, whereas that containing the formaldehyde dimethylhydrazone of the present invention shows effective stabilization.

When any of the aforementioned compositions containing formaldehyde dimethylhydrazone are employed, they are produced by dissolving the epoxide and phenol in themselves or in the diisobutylene which is advantageous for this purpose. The solutions are then introduced into the trichloroethylene with the composition being repeatedly recycled through a storage tank by a recirculating pump to homogeneously distribute the composition. The pH is then determined and, if it is less than 7, the composition is neutralized by bubbling gaseous ammonia therethrough. After neutralization, the hydrazone is added at the suction side of the circulating pump to obtain maximum homogenization. Finally the ammonia salts (e.g., ammonium chloride) produced by the neutralization are filtered from the mass. It has been found that this method is surprisingly effective in obtaining a highly stable composition, free from the lack of homogeneity characterizing earlier compositions of this type and affording maximum utilization of the formaldehyde dimethylhydrazone.

We claim:
1. A method of stabilizing trichloroethylene containing hydrogen, chloride, and phosgene, comprising the steps of admixing thymol in an amount ranging between substantially 0.001% and 0.01% by weight of the trichloroethylene, or p-tertiaryamyl phenol in an amount ranging between substantially 0.01 and 0.001% by weight of the trichloroethylene, or hydroquinone monomethyl ether present in an amount ranging between substantially 0.001 and 0.1% by weight of the trichloroethylene with at least one epoxide selected from the group consisting of propylene oxide and butylene oxide, said epoxide being present in an amount ranging between substantially 0.05% and 0.3% by weight of the trichloroethylene; dispersing the resulting mixture in said trichloroethylene by repeatedly pumping the trichloroethylene with said mixture added thereto along a recycling path; adding gaseous ammonia to the resulting composition and precipitating therefrom ammonia salts while neutralizing acidity of the composition; adding to said composition between substantially 0.001% and 1% by weight of the trichloroethylene of formaldehyde dimethylhydrazone having the formula

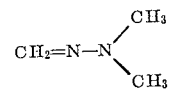

and thereafter filtering said ammonia salts from the composition, the composition being recycled by a circulating pump having an inlet side and an outlet side, said hydrazone being added to said composition at said inlet side of said pump.

References Cited
UNITED STATES PATENTS

| | | | |
|---|---|---|---|
| 2,319,261 | 5/1943 | Pitman | 260—652.5 |
| 2,385,475 | 9/1945 | Sconce | 260—652.5 |
| 3,031,410 | 4/1962 | Petering et al. | 260—652.5 |
| 3,043,888 | 7/1962 | Pray et al. | 260—652.5 |

OTHER REFERENCES

Treybal, "Mass Transfer Operations," pp. 365 to 367 (1955), TP 155. T7.

LEON ZITVER, *Primary Examiner.*

M. JACOB, *Assistant Examiner.*

U.S. Cl. X.R.

252—153

UNITED STATES PATENT OFFICE
CERTIFICATE OF CORRECTION

Patent No. 3,417,152　　　　　　　　　　　　　　December 17, 1968

Germano Patron et al.

It is certified that error appears in the above identified patent and that said Letters Patent are hereby corrected as shown below:

Column 1, line 40, "it" should read -- It --. Column 2, line 32, "dialkylhydrozones" should read -- dialkylhydrazones --. Column 6, line 16, "hydrogen," should read -- hydrogen --.

Signed and sealed this 17th day of March 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents

UNITED STATES PATENT OFFICE
CERTIFICATE OF CORRECTION

Patent No. 3,417,152                    December 17, 1968

Germano Patron et al.

It is certified that error appears in the above identified patent and that said Letters Patent are hereby corrected as shown below:

Column 2, line 45, the formula should appear as shown below:

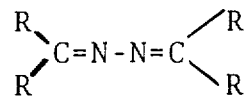

Column 4, lines 8 and 32, "0.25%", each occurrence, should read -- 0.025% --.

Signed and sealed this 9th day of June 1970.

(SEAL)
Attest:

EDWARD M. FLETCHER, JR.                WILLIAM E. SCHUYLER, JR.
Attesting Officer                       Commissioner of Patents